April 23, 1963     J. H. EAGLE ETAL     3,086,862
ROLL FILM FOR PHOTOGRAPHIC CAMERAS
Filed Aug. 19, 1959
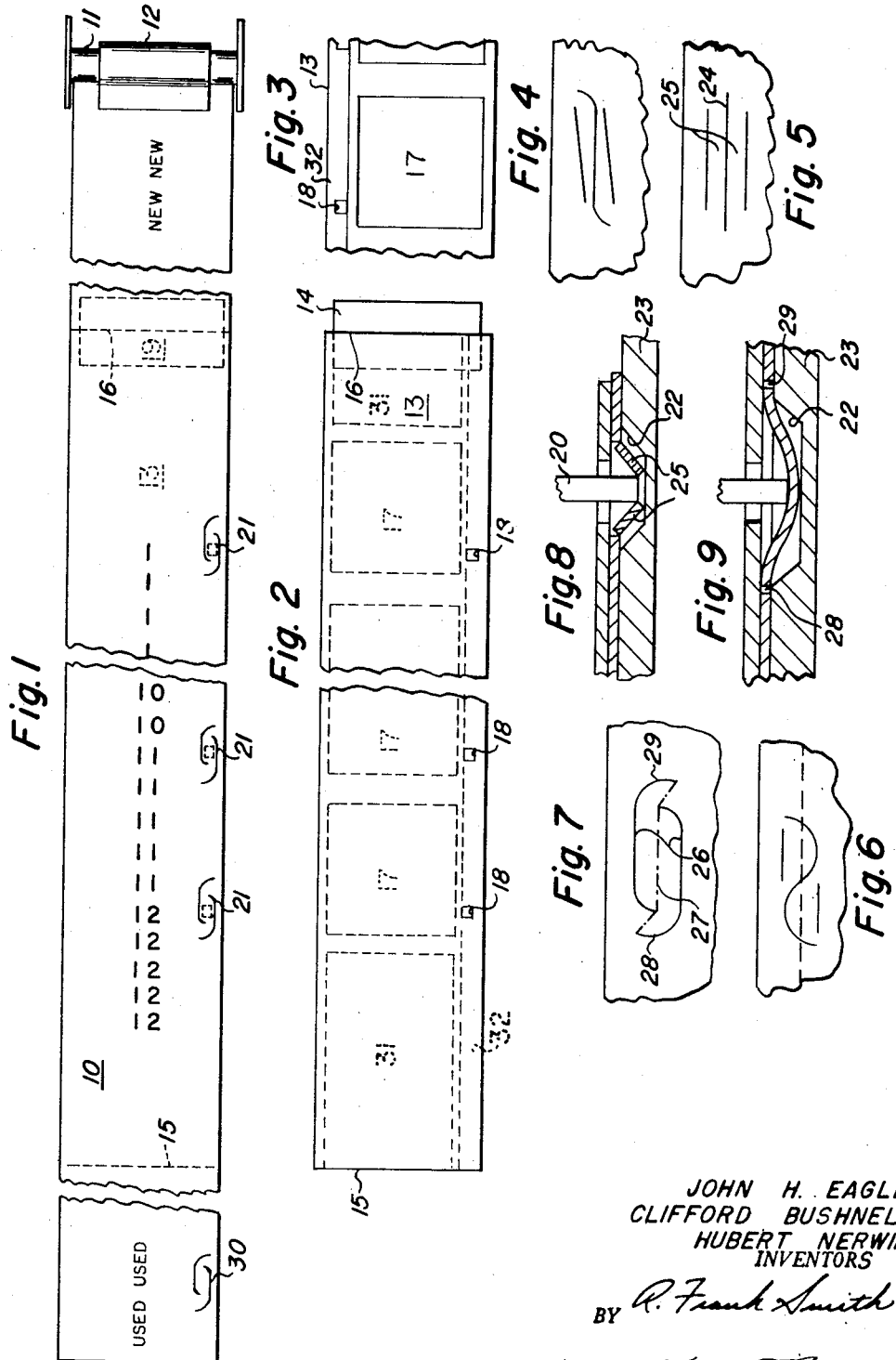
JOHN H. EAGLE
CLIFFORD BUSHNELL
HUBERT NERWIN
INVENTORS
BY R. Frank Smith
ATTORNEYS

United States Patent Office 3,086,862
Patented Apr. 23, 1963

3,086,862
ROLL FILM FOR PHOTOGRAPHIC CAMERAS
John H. Eagle, Clifford Bushnell, and Hubert Nerwin, Rochester, N.Y., assignors to Eastman Kodak Company, Rochester, N.Y., a corporation of New Jersey
Filed Aug. 19, 1959, Ser. No. 834,751
9 Claims. (Cl. 96—78)

The present invention relates to roll film for photographic cameras and particularly to photographic roll film provided with a light protective backing paper and having metering perforations therein to facilitate metering of the film strip through a camera for exposure and to effect accurate location of successive exposed and processed areas thereon with respect to the optical system of an enlarger or printer.

One object of the invention is to provide a light protective paper backing strip for photographic roll film provided with metering perforations prepared in such a way at the location of the perforations in the film that a metering pin can protrude not only through the film itself, but can also either extend through the backing paper or can locally displace the paper away from the film without permanently impairing the light sealing properties of the backing strip.

Another object of the invention is to provide a photographic film strip having light sensitive exposure areas defined by previously exposing the surrounding area of the light sensitive surface of the film strip, such exposure areas being definitely located with respect to metering perforations in the film adapted to accurately locate the exposure areas with respect to the optical system of a camera, enlarger, or printer so that the developed film can be processed by completely automatic equipment thereby reducing the cost of the finished prints. Other objects will appear from the following specification, the novel features being particularly pointed out in the claims at the end thereof.

Referring now to the drawings wherein like reference characters denote like parts throughout:

FIG. 1 is a broken plan view of the photographic roll film and backing paper as seen from the backing paper side.

FIG. 2 is a broken plan view of he film strip as seen from the side thereof adjacent the backing strip and showing the adhesive binder by means of which the film strip is attached to the paper backing strip.

FIG. 3 is a fragmentary view of the film strip as seen from the emulsion side thereof, and wherein the large rectangular area designates the light sensitive exposure area.

FIGS. 4, 5, 6, and 7 are fragmentary views showing various alternative patterns for slitting the paper backing strip.

FIG. 8 is a cross-sectional view taken through a metering perforation along a line transverse to the longitudinal axis of the roll film strip and showing the metering pin projecting through a slit of the pattern shown in FIG. 5 in the backing paper.

FIG. 9 is a cross-sectional view taken through a metering perforation along the longitudinal axis of the roll film strip and showing the metering pin extending through the perforation in the film and locally displacing a portion of the backing paper slit in the pattern shown in FIG. 7.

A basic consideration in the design of film to be used with automatic printing equipment is the provision of means whereby the exposed areas of the film are accurately located with respect to some form of metering perforations in the film in order that each negative area may be accurately and automatically aligned with the optical system of the automatic printer. The prior practice has been to provide spaced metering perforations in the film which cooperate with a metering mechanism in the camera to determine the relation of the exposed areas to the metering perforations. This system, however, is satisfactory only if the metering mechanism of the particular camera employed is designed to accurately meter the film in accordance with the particular metering arrangement employed in the automatic printer. Thus if the area exposed by the camera does not bear exactly the same relation to its corresponding metering perforation as the area printed by the automatic printer bears to the same perforation, corresponding cropping of the print will occur. One means of avoiding this disadvantage, and that which has heretofore been employed, is to print the picture through an aperture which is of smaller size than the camera exposure aperture, but which closely corresponds to the field of view of the viewfinder. This arrangement allows for some deviation in the location of the exposed area with respect to the perforation but has the disadvantage that, when the photographer compares his negative with the finished print, he is apt to note that what seems to be an important part of his picture at the edge of the negative does not appear on the print. The print area, of course, corresponds in size to the field of view of the viewfinder, but the photographer, nevertheless, has what he considers to be a justifiable complaint. This problem is avoided by our invention because the final print corresponds exactly to the negative. The previously determined exposure area on the film agrees in size with the viewfinder but is smaller than the exposure area of the camera so that the entire sensitive area is exposed even if the exposure area is not exactly aligned in the center of the exposure aperture. In case of such misalignment, the finished print will not correspond exactly to what was seen through the viewfinder, but the error is negligible and not so apt to be noted by the photographer. This allowance for the variation in metering mechanisms would also allow the use of other camera metering means independent of the perforations if desired. Conventional metering numbers on the backing paper, for example, might be employed to locate the exposure area in the exposure aperture, although the deviation between the area viewed through the viewfinder and that recorded on the film would be substantial unless the metering numbers were very carefully aligned in the window.

Another problem encountered in the utilization of film embodying metering perforations arises where it is desired to provide the film with a conventional form of light protective backing paper. If the film metering pin in the camera is adapted to enter the perforations in the film from the emulsion side, the movement of the pin will be limited to the thickness of the film strip if the backing paper is in contact with the back surface of the film behind the perforation and if no provision is made to allow the pin to pass through the backing paper. This limited movement of the metering pin is not sufficient to actuate the camera metering mechanism. The most obvious solution to this problem is to provide corresponding perforations in the backing paper to allow the pin to extend through both the film and the paper, but this approach results in destroying the light seal at the points where the paper is perforated. Another alternative is to separate the backing paper from the film strip in the area of the metering pin. This approach, however, necessitates the provision of means to position a separating member between the film and the paper. Past attempts to solve this problem have not proven entirely successful as binding or tearing is likely to occur at the point where the separating member is introduced between the film and the paper. In order to overcome these problems we have provided our perforated film with a light protective backing paper prepared in such a way that the camera metering pin can protrude through the perforation in the film and can also either protrude through the backing paper or can locally displace a portion of the pin in order to increase the effective travel of the pin without permanently impairing the light protective property of the paper at this point. This light protective backing paper is equally applicable to any type of roll film employing a metering perforation to locate the film for each exposure, regardless of whether the film strip utilizes the above discussed previously defined sensitive exposure areas. That part of the invention dealing with the previously determined film exposure areas in definite relation to the metering perforations is likewise applicable to film with which no protective backing paper is used.

Referring now to the drawings, FIG. 1 illustrates an assembled roll of film as viewed from the backing paper side and comprising a light protective paper backing strip 10, one end of which is attached to a take-up spool 11 by means of an adhesive paster 12. The roll film illustrated is adapted to be employed in a dual compartment magazine in which the film is rolled upon itself in one compartment and is drawn across the exposure aperture and wound onto the take-up spool 11 in the other compartment. It is understood, however, that the invention is equally applicable to conventional forms of roll film wherein the film is wound from a supply spool onto a take-up spool. The leading end 16 of a film strip 13, as shown in FIGS. 2 and 3 is attached to the front side of backing strip 10 by means of an adhesive paster 14. As viewed in FIG. 1, the film strip has its emulsion side facing downward, the ends 15 and 16 of the film strip being indicated by broken lines. FIG. 2 shows the film strip in the same relative position as in FIG. 1 but with the backing paper removed. FIG. 3 is a fragmentary view of a portion of the film as viewed from the emulsion side. Located on the emulsion side of the film, are a series of uniform equi-distantly spaced sensitive exposure areas 17 as shown by solid lines in FIG. 3, and by broken lines in FIG. 2. These sensitive exposure areas are defined by previously exposing the emulsion surface of the film surrounding the areas 17 during the manufacture of the film. The remaining unexposed emulsion areas, comprising the rectangular areas 31 and the narrow marginal area 32 are utilized for purposes of film identification. The drawings showing the sensitive areas as being defined by a visible line are illustrative only, since prior to development, no visible change occurs in the emulsion coating. As was previously explained, each exposure area 17 corresponds to the field of view of the camera viewfinder but is appreciably smaller than the camera exposure aperture to insure that all of the area 17 will be exposed even if the area is not exactly centered in the exposure aperture. A metering perforation 18 is located along the edge of the film adjacent each exposure area 17 as shown in FIGS. 2 and 3. These perforations, of course, need not occupy the precise location shown in the drawings so long as all the perforations are located uniformly with respect to their corresponding exposure areas and so long as the metering provisions of the camera in which the film strip is to be used and of the printer or enlarger on which the processed film strip is to be printed approximately correspond to the relative location of the exposure areas and perforations of the film. Referring to FIG. 2, for example, with the metering perforations located in the position illustrated it is necessary only that the projection of the camera metering pin 20 through perforation 18 will cause the exposure area 17 to be located within the larger camera exposure aperture. In printing the film it is likewise necessary only that the metering pin, not shown, of the printer or enlarger will cause the then developed negative defined by area 17 to be located within the printing aperture, with the surrounding previously exposed area filling the remainder of the aperture. In order to allow the camera metering pin 20 to either protrude through or to locally displace the backing pape, as previously discussed, the backing paper is provided with a slit area 21 behind each perforation 18 as shown in FIG. 1. Since no paper is removed in the slitting operation, the light sealing properties of the paper are not impaired so long as the central portion of the slit pattern remains flat. Various alternative slitting patterns are illustrated in FIGS. 4–7.

Those patterns shown in FIGS. 4, 5, and 6, are so designed as to allow the metering pin 20 to protrude through the backing paper, while the pattern illustrated in FIG. 7 allows the pin to displace the central portion of the pattern out of the plane of the rest of the backing paper. FIG. 8 is a cross-sectional view taken through a metering perforation along a line transverse to the longitudinal axis of the roll film strip and showing the metering pin 20 projecting through the center slit 24 of the pattern shown in FIG. 5 and into a recess 22 in the film supporting wall 23 of the camera. As shown in FIGS. 5 and 8, the narrow strips of paper 25, between the parallel slits, are twisted to allow the pin 20 to pass through the central slit and, upon the withdrawal of the pin, the natural resiliency of the paper causes the slit area to return to its former flat condition. Even if the pattern does not completely reclose by its own resiliency, it will be restored to its former light protective condition by the advancing of the film and the winding of subsequent convolutions over the slit area. While the slitting patterns shown in FIGS. 4 and 6 do not present exactly the same cross-sectional appearance as that illustrated in FIG. 8, the basic principle is the same. The latter two patterns are preferable to that shown in FIG. 5 in that less distortion of the paper occurs when the pin passes through the center slit, but the slitting operation iself is more complicated than that involved in producing the pattern shown in FIG. 5.

FIG. 7 illustrates a slitting pattern in which the metering pin 20 does not extend through a slit in the backing paper but rather displaces the central portion of the pattern. FIG. 9 is a cross-sectional view through a metering perforation along the longitudinal axis of the roll film strip to illustrate the operation of the pattern shown in FIG. 7. This pattern comprises two interlocking U-shaped slits 26 that define an imaginary S-shaped stress line 27, indicated in broken lines. Pressure of the pin 20 against the central portion of the area enclosed by the slits 26 causes the imaginary line 27 to be somewhat straightened, thereby opening the slits at points 28 and 29 as seen in FIG. 9. This opening at points 28 and 29 allows the pin to press the central portion of the pattern against the bottom of the recess 22 in the film support wall 23. The advantage of this pattern lies in its particularly good self-restorative qualities.

Referring again to FIG. 1, an additional slitting pattern 30 is illustrated near the extreme end of the backing paper and beyond the end of the film strip. This pattern is provided to effect the stopping of the camera winding mechanism at the end of the roll in the event that it is desired to prevent the entire strip from being wound onto the take-up spool. Indicia may be printed on the back surface of the backing paper as shown in FIG. 1 to indicate the beginning and end of the roll and the number of the exposure area in the exposure aperture through a window in the back of the camera. The numbering system illustrated employs a continuous line of numbers in order that the viewing window may be located at any desired point along the center line of the film strip behind the exposure aperture.

While we have shown and described certain specific embodiments of our invention, we are fully aware that certain modifications thereof are possible. Our invention, therefore, is not to be limited to the precise details of construction shown and described but is intended to cover all modifications coming within the scope of the appended claims.

Having thus described our invention, what we claim as new and desire to secure by Letters Patent of the United States is:

1. A roll film for use in a photographic camera having a movable film metering member adapted to ride on one surface of the film to stop the advance thereof upon penetration of the member into an opening therein; said film comprising: a flexible support web having a light-sensitive layer on the front surface thereof and provided along its length with a series of metering openings extending through said web and adapted to be penetrated by said film metering member to stop the advance of film in said camera, and a light protective backing strip overlying at least part of the rear surface of said web; a slit area in said strip adjacent each of said metering openings, each of said slit areas having three parallel longitudinal light-tight slits extending through said backing strip, the center one of said slits being located behind the longitudinal center line of said metering opening adjacent thereto, said slits being of such configuration as to allow a portion of said film metering member to extend across the plane of said strip surrounding said area in the course of penetration movement of the member without permanently impairing the light protective properties of the strip in said area after said member is withdrawn from said opening.

2. A roll film for use in a photographic camera having a movable film metering member adapted to ride on one surface of the film to stop the advance thereof upon penetration of the member into an opening therein; said film comprising: a flexible support web having a light-sensitive layer on the front surface thereof and provided along its length with a series of metering openings extending through said web and adapted to be penetrated by said film metering member to stop the advance of film in said camera, and a light protective backing strip overlying at least a part of the rear surface of said web; a slit area in said strip adjacent each of said metering openings, each of said slit areas having three light-tight slits extending through said backing strip comprising a center slit including an elongated straight longitudinal middle portion located behind the longitudinal center line of said opening and having an upwardly turned arcuate continuation adjoining one end thereof and a downwardly turned arcuate continuation adjoining the opposite end thereof, and second and third straight slits of approximately the same length as the straight central portion of said central slit, spaced from and symmetrically located on opposite sides of said central portion of said central slit, said slits being of such configuration as to allow a portion of said film metering member to extend across the plane of said strip surrounding said area in the course of penetration movement of the member without permanently impairing the light protective properties of the strip in said area when said member is withdrawn from said opening.

3. A roll film for use in a photographic camera having a movable film metering member adapted to ride on one surface of the film to stop the advance thereof upon penetration of the member into an opening therein; said film comprising: a flexible support web having a light-sensitive layer on the front surface thereof and provided along its length with a series of metering openings extending through said web and adapted to be penetrated by said film metering member to stop the advance of film in said camera, and a light protective backing strip overlying at least a part of the rear surface of said web; a slit area in said strip adjacent each of said metering openings, each of said slit areas including three light-tight slits extending through said backing strip, one of said slits being in the form of a horizontal ogee curve disposed along a first imaginary line behind the longitudinal center line of said metering opening adjacent said area, a second of said slits being in the form of a straight slit centrally located along a second imaginary line substantially tangent to one arc of said curve, and the third slit located symmetrically with respect to said second slit on the opposite side of said first imaginary line, said slits being of such configuration as to allow a portion of said film metering member to extend across the plane of said strip surrounding said area in the course of penetration movement of the member without permanently impairing the light protective properties of the strip in said area when said member is withdrawn from said opening.

4. A roll film for use in a photographic camera having a movable film metering member adapted to ride on one surface of the film to stop the advance thereof upon penetration of the member into an opening therein; said film comprising: a flexible support web having a light-sensitive layer on the front surface thereof and provided along its length with a series of metering openings extending through said web and adapted to be penetrated by said film metering member to stop the advance of film in said camera, and a light protective backing strip overlying at least a part of the rear surface of said web; a slit area in said strip adjacent each of said metering openings, each of said slit areas comprising two like substantially U-shaped slits extending through said backing strip and disposed in interlocking nonintersecting relation with their respective arms facing one another and spaced longitudinally of the backing strip, the bases of said U-shaped slits being located on opposite sides of and equidistantly spaced from an imaginary line behind the longitudinal center line of said metering opening adjacent said area, said slits being of such configuration as to allow a portion of said film metering member to extend across the plane of said strip surrounding said area in the course of penetration movement of the member without permanently impairing the light protective properties of the strip in said area when said member is withdrawn from said opening.

5. A roll film for use in a photographic camera having a movable film metering member adapted to ride on one surface of the film to stop the advance thereof upon penetration of the member into an opening therein; said film comprising: a flexible support web haing a light-sensitive layer on the front surface thereof and provided along its length with a series of metering openings extending through said web and adapted to be penetrated by said film metering member to stop the advance of film in said camera, and a light protective backing strip overlying at least a part of the rear surface of said web; a slit area in said strip adjacent each of said metering openings, each of said slit areas comprising two interlocking nonintersecting elongated light-tight slits extending through said backing strip, the central portions of said slits being located on opposite sides of and equidistantly spaced from an imaginary line behind the longitudinal center line of said metering opening adjacent said area, the ends of said slits extending at least to said imaginary line, said slits being so disposed as to define a longitudinally elongated central area connected to the remainder of said backing strip toward each end of said central area, said slits being of such configuration as to allow a portion of said film metering member to extend across the plane of said strip surrounding said area in the course of penetration movement of the member without permanently impairing the light protective properties of the strip in said area when said member is withdrawn from said opening.

6. A roll film for use in a photographic camera having a movable film metering member adapted to ride on one surface of the film to stop the advance thereof upon penetration of the member into an opening therein; said film comprising: a flexible support web having a light-sensitive layer on the front surface thereof and provided along its length with a series of metering openings extending through said web and adapted to be penetrated by said film metering member to stop the advance of film in said camera, and a light protective backing strip overlying at least a part of the rear surface of said web; a slit area in said strip adjacent each of said metering openings, each of said slit areas having two light-tight slits extending through said backing strip comprising a first longitudinally elongated slit including a central portion thereof spaced by a first distance from one side of an imaginary line behind the longitudinal center line of said metering opening adjacent said area, the ends of said first slit extending at least to said imaginary line, and a second slit on the opposite side of said imaginary line the central portion of said second slit being spaced from said imaginary line by said first distance, the ends of said second slit extending at least to said imaginary line, said slits being nonintersecting and so disposed in interlocking relation as to define a central area connected to the remainder of said backing strip at each end of said central area by a connecting strip defined by the adjacent ends of said slits, said slits being of such configuration as to allow a portion of said film metering member to extend across the plane of said strip surrounding said area in the course of penetration movement of the member without permanently impairing the light protective properties of the strip in said area when said member is withdrawn from said opening.

7. A roll film for use in a photographic camera having a movable film metering member adapted to normally ride against one surface of the film to stop the advance of a given length of the film upon penetration of the member into a metering opening therein and adapted to be withdrawn from said opening to free the film for a subsequent advance, said film comprising: a flexible support web having a light-sensitive layer on the front surface thereof, said layer including at least one latent image defining a plurality of light-sensitive exposure areas spaced along said web, said web being provided along its length with a plurality of spaced metering openings extending therethrough and to be penetrated by said metering member, each of said openings bearing a predetermined spatial relation with a corresponding one of said exposure areas; and a light protective backing strip overlying at least part of the rear surface of said web, a slit area in said strip adjacent each of said openings defining at least two unconnected and normally light-tight slits extending through said strip and substantially in the same direction, said slits being configured so as to allow at least a portion of the area of said strip to be displaced from contact with said web when pressure is applied transversely of said strip by the metering member in the course of penetration movement of the member into the corresponding opening, without permanently impairing the light protective properties of said strip in said area when the metering member is withdrawn from said opening.

8. A roll film for use in a photographic camera having a movable metering member adapted to normally ride against one surface of the film to stop the advance of a given length of the film upon penetration of the member into a metering opening therein and adapted to be withdrawn from said opening to free the film for a subsequent advance, said film comprising: a flexible support web having an unexposed light-sensitive layer on the front surface thereof, said web provided along its length with a plurality of spaced metering openings extending therethrough and to be penetrated by said metering member to stop the advance of film through a camera; and a light protective backing strip overlying at least part of the rear surface of said web, a slit area in said strip adjacent each of said metering openings defining at least two unconnected and normally light-tight slits extending through said strip, said slits being configured so as to allow at least a portion of said area of the strip to be displaced from the plane of the strip when pressure is applied transversely of said strip by the metering member in the course of penetration movement of the member into the corresponding metering opening to stop the advance of said film, without permanently impairing the light protective properties of said strip in said area when the metering member is withdrawn from said opening to free the film for a subsequent advance.

9. A roll film according to claim 8, wherein the said slits extend substantially longitudinally of said strip.

References Cited in the file of this patent

UNITED STATES PATENTS

| 375,231 | Torndoff | Dec. 20, 1887 |
| 1,795,050 | Simjian | Mar. 3, 1931 |
| 1,826,695 | Favour | Oct. 6, 1931 |
| 2,612,452 | McCune | Sept. 30, 1952 |

FOREIGN PATENTS

| 9,404/32 | Australia | Sept. 30, 1932 |
| 548,322 | Germany | Apr. 11, 1932 |
| 557,695 | Germany | Aug. 26, 1932 |